United States Patent [19]
Leistritz

[11] Patent Number: 4,736,584
[45] Date of Patent: Apr. 12, 1988

[54] AFTERBURNER APPARATUS

[76] Inventor: Hans K. Leistritz, Stegwiesen 8, D 7891 Kussaberg 2, Fed. Rep. of Germany

[21] Appl. No.: 16,094

[22] Filed: Feb. 18, 1987

Related U.S. Application Data

[63] Continuation of Ser. No. 641,581, Aug. 17, 1984, abandoned.

[30] Foreign Application Priority Data

Aug. 20, 1983 [DE] Fed. Rep. of Germany ....... 3330186
Nov. 24, 1983 [IT] Italy ................... 4851 A/83
Dec. 28, 1983 [DE] Fed. Rep. of Germany ....... 3347266
May 30, 1984 [DE] Fed. Rep. of Germany ....... 3420158

[51] Int. Cl.$^4$ ............................ F01N 3/26; F01N 3/38
[52] U.S. Cl. ........................................ 60/303; 60/312; 60/314
[58] Field of Search ........................ 60/303, 312, 314

[56] References Cited

U.S. PATENT DOCUMENTS 3,989,469 11/1976 Leistritz ................................ 60/303
4,318,887 3/1982 Leistritz ................................ 422/173

Primary Examiner—Douglas Hart
Attorney, Agent, or Firm—Watson Cole

[57] ABSTRACT

An afterburner combustion chamber receives internal combustion engine exhaust gases and the ignition of the gases in the main engine combustion chamber and the afterburner combustion chamber are synchronized with one another. Auxiliary air is supplied to an afterburn area including the combustion chamber. Exhaust gases are expelled onto a reflection wall upstream from the afterburner combustion chamber. The waste gases are ignited by spark ignition means. A volume expansion chamber leads from the ignition area and communicates with a convergent flow channel and a draft section for forming a gas column tuned by the cross section and length of the draft section for optimum filling of the engine combustion chamber. Ambient air is introduced into the draft section for stabilizing the thermal accumulation within the afterburner apparatus.

5 Claims, 3 Drawing Sheets

AFTERBURNER APPARATUS

This is a continuation of application Ser. No. 641,581 filed Aug. 17, 1984, now abandoned.

BACKGROUND OF THE INVENTION

1. Field of the Invention

The invention is directed to the treatment of the waste gas of internal combustion engines, and in particular to method and apparatus for integrated control as to the time, amount and quality of the explosion in the engine and an afterburner.

2. Prior Art

The piston engine as power engine has the purpose to transform thermal energy into mechanical work. In the reciprocating piston engine this is accomplished by connecting the piston stroke to a crank gear and in the rotary piston system of the Wankel engine—which operates with a four-stroke Otto engine gas exchange—by integration of the piston drive. In scientific studies, both systems are subject to the criterion that their effectiveness be sufficient, and each study of the working process of these engines differentiates between their theoretically perfect execution and that which can be technically achieved.

The internal combustion engines, executed as piston engines, work in the manner of internal combustion engines according to a thermal interval technique. Regardless if their gas exchange process is planned in a four-cycle or two-cycle structure, there is as a rule first a self-priming and compressing filling process with a fuel/air mixture, followed by spark or self-ignition and then an explosive evacuation process with expulsion of the waste gas through a valve (four-cycle Otto engine with reciprocating piston) or slit (two-cycle reciprocating piston engine and Wankel engine) into the open atmosphere. With the waste gas expulsion at the engine exhaust, the discontinuous process of this type of internal combustion engine is completed, and any waste gas installation—which mainly serve for muffling or a thermal waste gas treatment—attempt to complete their task by trying to convert the discontinuous process into a continuous process. By their smoothing of the procedure they affect the conversion of the pulse characteristic into the continuity of a flow process from the engine exhaust. It is especially true that so far even thermal reactors see in this method of converting the discontinuous gas exchange, the possibility to get rid of waste gas pullutants by afterburning, while they attempt to approach as much as possible the flow technique which has the developed combustion technique (from the Bunsen burner to the modern fan burner) with its control system of a burner feed that is as regular as possible.

SUMMARY OF THE INVENTION

A decisive aspect for the afterburn technique of the invention is primarily the quantitative restriction to the individual waste gas emission from the piston stroke and the acoustic wave emission connected to it, as well as the integration of this process into the time-stroke of the engine gas exchange.

It is necessary to recognize here that the phenomenon of this expulsion comprises two processes of various speeds: first the flowing gas mass, the speed of which is revolution dependent, and also depends on—besides the loading condition of the explosion engine—the respective piston speed; and secondly the progress of the acoustic wave which is usually at a higher speed and—usually calculated at sonic speed—depends in actuality on the execution of the exhaust vent(s) or slit(s) provided behind the piston stroke, and the special shape of the subsequent passage, which runs from the body of the engine to the exhaust flange.

The expulsion goes into the afterburn chamber for the purpose of its filling and ends with the closing of the valve or slit; what is designated as "expulsion" from the process of the main engine explosion, at least from the valve or slit, is considered as a filling wave when talking about the afterburn process.

The filling wave of the afterburn chamber—at high speed, in the first part, as all exhaust processes—should have completed, in this first part, the filling of the afterburn chamber, as far as its gaseous medium is concerned. With its quantitative completion, there is an automatic delay phase, during which the time is given for the approximately simultaneous afterburn with the main explosion. Depending on the type of engine, this instant in time has to be in agreement with the new charge compression in the engine combustion chamber; as this contains, at the same time, the coordination with the closed setting of the engine exhaust.

For the construction of the afterburn chamber, the following ideas apply:

For its positioning (inside of the waste gas installation, attached on the engine exhaust or after a short distance in the main body of the engine at an external flange, or integrated with the cylinder head of the reciprocating piston engine) the aspect of completing the filling of the afterburn chamber is important, as its filling takes place during the same time in which the engine compresses its next new change.

A repulsion arrangement is preferred, which makes the realization of the phenomenon known from wave research possible, that the wave from the engine explosion—which precedes the waste gas exhaust because of higher speed—is reflected and runs against and into the waste gas stream, thus creating turbulences, compressions and further heating, without the need for chemical reactions and thus does not cause higher fuel needs.

It is essential to have an ejector type loading of the instreaming gas amount of the waste gas exhaust into the downstream track of the filling wave with additional air.

It is essential to have—attached to the suctioning effect of the evacuation wave—an air purge provided for inside the afterburn chamber, peripherally at the outside wall.

It is essential to have an ignition track, usually running axially across the afterburn chamber, which reaches cherry-red glow a short time after cold start and uses its glow surface properties to also lead all alternating operational conditions with highest speed rates to the final combustion.

It is essential that, at the moment of the afterburn, the afterburn chamber be completely included in the reflection wall, except the exit oriented transition from the downstream part of the afterburn chamber into an extended and narrower draft length; this also applies to the auxiliary air chambers—executed in a resonator-type manner—into which the air flow from the free atmosphere takes place, and to the completely closed position of the exhaust valve or slit.

With the afterburn, arranged in the timing of the engine gas exchange at a short distance after the engine exhaust, occurs the production of kinetic energy to such an extent that still pollutants achieve an explosive combustion. In variation from the catalytic and thermal waste gas treatment procedures, which build flow resistors in the waste gas pipes, this flow energy supports the expulsion work of the main engine explosion, so that there is a reduction of the gas exchange work of the engine and thus, possibly, also a filling improvement and an increase in the engine output. This phenomenon, which can be described as a reaction effect to the main explosion, is known in engine construction from several operational conditions in waste gas turbo charge. To which extent it can be fully attained, depends on the individual tuning work by the test engineer. In reality, this has two effects: first, the test engineer has the possibility to adjust each engine for the best output quality for each application, without regard to the air ratio. Secondly he only has to take care that the afterburn remains at the quality level of the explosive process, as only the explosibility characteristic of this process in a second combustion stage supplies—provided there is a correct charge with auxiliary air and a correct shape of the combustion chamber—the sudden volume increase of the expanding gas, which provides the effect, at the exit, of a type of flow wave. When the engine exhaust opens again after the following cycle of engine gas exchange, the more intensely running gas column has the effect that the suction effect on the exhaust thrust of the engine is increased. To which extent the process includes an improvement of the expansion work after the main engine explosion—at least, to which extent it appears—will only become obvious by the tuning work of the engineer. Scientific theory cites as a basic disadvantage of the piston engine the great loss by incomplete expansion - the statement be permitted, that the especially great pipe lengths below most automobiles require a special tuning, in order to fully benefit from the flow energy effected by the afterburn.

The scientific theory justifiably criticizes the incompleteness of the expansion process after the engine explosion and rates this loss at 13% of the invested heating value. This loss cannot be avoided in the single-step piston engine, as it is practically not possible to realize expansion ratios in the engine as desired; on the one hand, the required weight would become too high, and on the other hand, the gain in internal work would be equalized—often even exceeded—by higher friction.

In a practical manner, the fact is important that the highest output is achieved with lack of air, and the best efficiency with an excess of air. Taking this fact into account, all tuning engineers use the device of setting a rich fuel/air mixture for the highest output which is only used for a short time (with an air factor Lambda between 0.85 and 0.95) and for continued output with lower efficiency levels, a lean mixture (with Lambda 1.0 and higher) for best use value. However, this is only a clever tuning device which does not change the fact that better use is made in the ratio gram/hp/hour with excess air. If fully contemplated, the issue in improving the working process is not to make stoichiometric tuning possible (with Lambda around 1.0) which will never permit the best output use, but the disappearance of the fuel loss which is poured into the waste gas as faulty final combustion product and which appears in the free atmosphere as pollutant emission.

The discontinuity of the gas exchange process in the piston engine is expanded through the engine exhaust with a two step gas exchange process in such a manner that without additional use of construction elements of the machine industry, such as turbo chargers or piston compressors, the expansion wave of the piston engine is extended—with as little transition as possible—into the filling wave of an afterburn chamber, into which a waste gas/air mixture is fed which is ignited by a spark or glow surface ignition. The kinetic energy from this afterburn process—executed with closed engine exhaust and is initiated from cold start by a spark ignition, synchronized with the engine ignition—combines with the kinetic energy of the waste gas expulsion into an evacuation wave which expels the waste gas amount expelled with the main explosion from the engine combustion chamber after a single engine cycle now also from the afterburn chamber, which is subjected to a peripheral air purging before the next cycle. Both explosion processes, i.e. the main explosion of the new motor fill and the afterburn of the previous exhaust gas expulsion, are subject to an integrated overall control as to time, amount and quality of the mixture, which is also maintained for multi-cylinder reciprocating piston engines for the cycle of each individual compression process is such a manner that no combination of the various reciprocating amounts can take place in one combustion chamber, as is the case with thermal reactors. The discontinuously running thermal interval technique of engine main explosion is continued in the afterburn technique. It follows all numbers of revolutions. a speed of 3000 rpm with 3000 main explosions in a two-cycle engine and 1500 in a four-cycle system is followed by an equal number of afterburns.

The invention also contains a treatment of the waste gas of the piston engines but is not generally classified as a waste gas treatment process. It is principally a further development of the working process of the internal combustion engine, constructed as piston engine, and the influences of this further development extend to a multitude of subjects: not only to the exhaust process, but also to the mixture formation in the Otto engine. In particular, the technical conflict is removed which came about by the fact that measures which had to be taken by engineers in order to obtain environmentally acceptable waste gas quality, could no longer be coordinated with the production of engine output, the flexibility of the combustion process and the fuel use problems. In addition, the rise in costs, brought on by known thermal and catalytic processes of waste gas cleaning, had to be returned to reasonable levels.

BRIEF DESCRIPTION OF THE DRAWINGS

The schematic drawing in FIG. 1 illustrates the connection of the afterburn chamber on a two-stroke engine and shows the waste gas feed at a certain piston position;

The schematic drawing in FIG. 2 shows the connection on a four-stroke reciprocating piston engine with closed exhaust valve. The numbered arrows point to three different air crossing paths; and The schematic drawing in FIG. 3 shows an application model in industrial engines which are equipped with air ventilation cooling.

Figure 1:
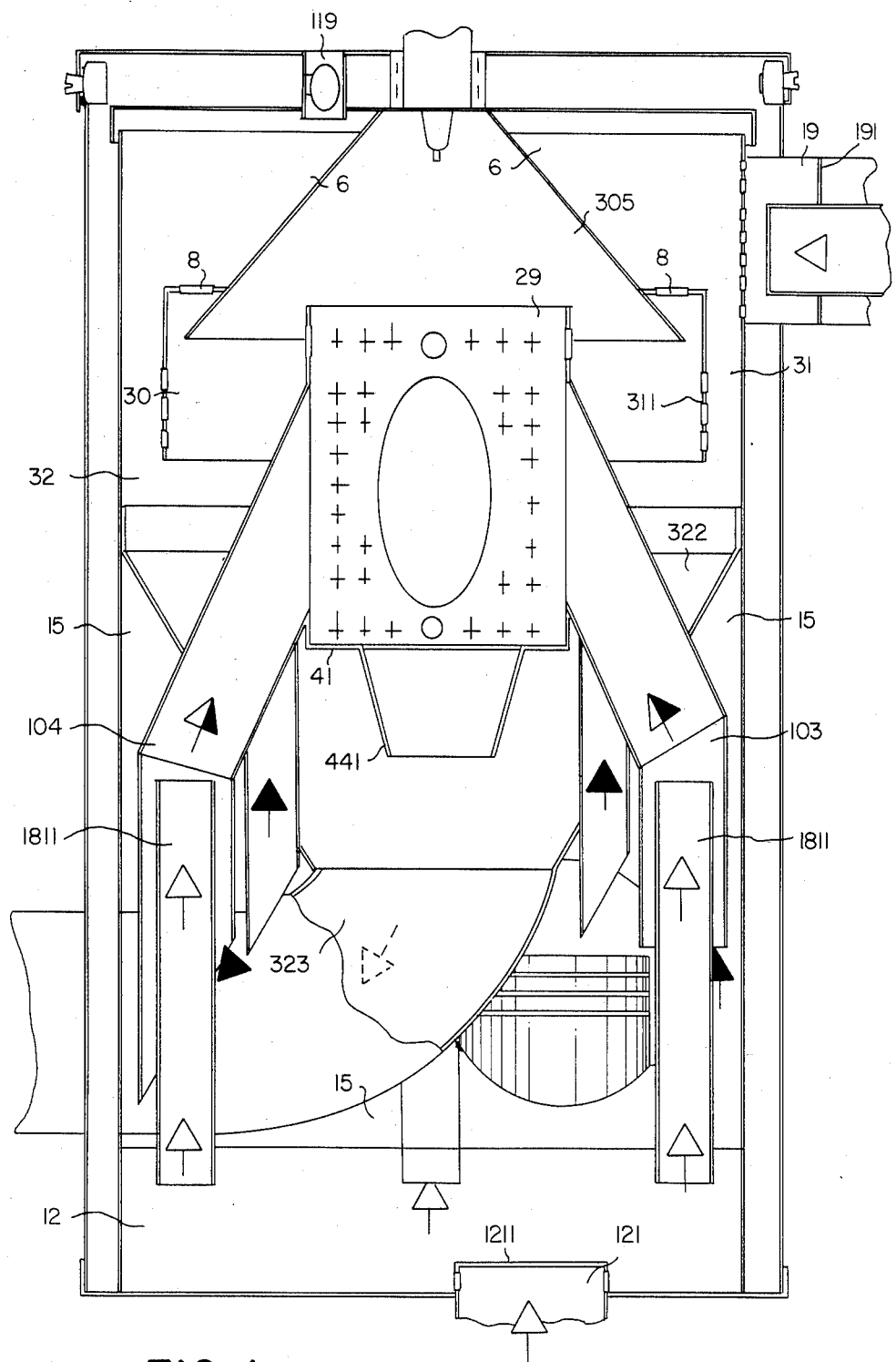

The black arrows in the drawings show the path of the waste gas from the engine exhaust, the black/white arrow points a waste gas/air mixture, the white arrow points the path for the auxiliary air, the broken arrow points pollution free waste gas.

DETAILED DESCRIPTION

The schematic drawing FIG. 1 shows the connection of the afterburn chamber to a two-stroke engine. It is especially clear because of the fact that it plainly presupposes a certain piston position and from this position of the gas exchange process explains the integrated gas exchange procedures of the main engine explosion and the coordinated afterburn. The piston, visible through the short pipe which connects the slit with the inflow zone 15, is in motion from its lowest resting point and on its way to the upper resting point. As the exhaust slit is still half open, the expulsion of the waste gas is already mostly completed and the waste gas quantity not only fills the inflow space 15, but has already entered pipes 103 and 104 which lead from space 15. The waste gas is represented by the black arrows. Within the pipes 103 and 104 are the narrower pipes 1811, at the exit of which auxiliary air is ejected in a known manner from an inflow chamber 12; for this purpose, pipe 121 in chamber 12—provided with holes and a closing wall 1211—is connected to the free atmosphere. In the downstream part of pipes 103 and 104 there is not yet any waste gas/air mixture, but only a waste gas/air accumulation. As the pipes 103/104 and following are coordinated in the charge element 29—in the same flow direction from the edge—the waste gas/air accumulation, designated by the black/white arrow, flows in the area 29 into a closer mixing phase, into which the smaller pipes 106, 107, entering pipes 103/104 from the sides, are also included. As soon as the piston has reached the upper resting point—according to the two-stroke process—has completed the compression of the next new charge and closed the exhaust slit, the waste gas/air accumulation—in the meantime, because of wall reversal, in the form of a further improved mixture and turbulence—is in the combustion zone 305 and the subsequent spaces 30/32 with entry into the nozzle 322. Thus, both explosion chambers, the main engine explosion chamber and the afterburn chamber, are ready for combustion. The afterburn ignition, occurring after cold start of the engine in synchronization with the engine ignition, causes a sudden volume increase which can be observed at the exhaust as practically inaudible deflagration. The nozzle 322 constructed in a converging shape. It continues into a pipe-shaped, elongated channel 323, which has to be calibrated on the output test stand. With higher numbers of rotation, a flowing gas column forms in this pipe 323, in which the kinetic energy or the main engine explosion and after burn, integrated into its pulse characteristic, are combined. It is here that the aspects can be seen which are essential for the further development of the afterburn chamber.

It has previously been pointed out that the current approach not only starts from the medium of the waste gas flow, but also from the acoustic wave front which crosses it and runs ahead of it. For it to get fully into the process, the inflow space 15 should not have any built-ins which could substantially reduce this sudden change of pressure. The so-called acousticwave phenomenon has been explained by scientific acoustic wave research, which makes it possible to attain an acousticwave reflex (in FIG. 1 on the inside wall of the ignition zone 305; in FIGS. 2 and 3 especially on the reflex wall designated by 211) which—because of its higher speed as compared to the waste gas ejection—reaches the reflex wall earlier and is reflected to run back into the slower waste gas stream inside of the space 29, thus causing in many ways turbulences, compression and heating up. This causes—without it being a chemical reaction (in the sense of higher costs for additional fuel use)—the formation of a hot spot in the afterburn chamber, which stabilizes more and more as the number of rotations rises. It becomes also clear why this axial loading element is constructed axially open on both sides: only such a hot spot made it possible to construct a flame ignition pipe 411 which extends across the ignition zone, started in zone 305 with the spark axially to the nozzle 322, from which even changing operating conditions with their always increased and unreliable pollutant accumulation cannot escape. Under full load conditions, the final combustion zone usually shifts completely into the area for the nozzle and start of the draft section 323. In this connection it becomes also clear what importance is played by the peripheral air injection besides the air injection into the pipes 103 and following, which—as can be seen in all three schematic drawings—can be applied from pipe 191 with or without ventilation admission pressure, as well as with or without control device 199 in FIG. 2 as well as with or without an oxygen probe in such a manner that increased auxiliary air application can be arranged in the downstream nozzle area as well as oxygen deprivation in the whole draft section area 323, if there is a need for nitric oxide reduction in certain operational conditions.

FIG. 1 also shows a two-way separation of the auxiliary air mixing. This is the actual meaning of the space part 311 as an auxiliary air conduction element; it is also planned in FIGS. 2 and 3. The pipe section 119—provided with a closing flap—is a control device for direct observation and the introduction of measuring instruments (the same applies to the control pipe 400 in FIG. 2). In all three schematic drawings there is behind the reflection zone 305 an auxiliary air inflow chamber 6 from which the two way separation of the mixed air proceeds through the holes 8 and the annular area 31.

Figure 2:
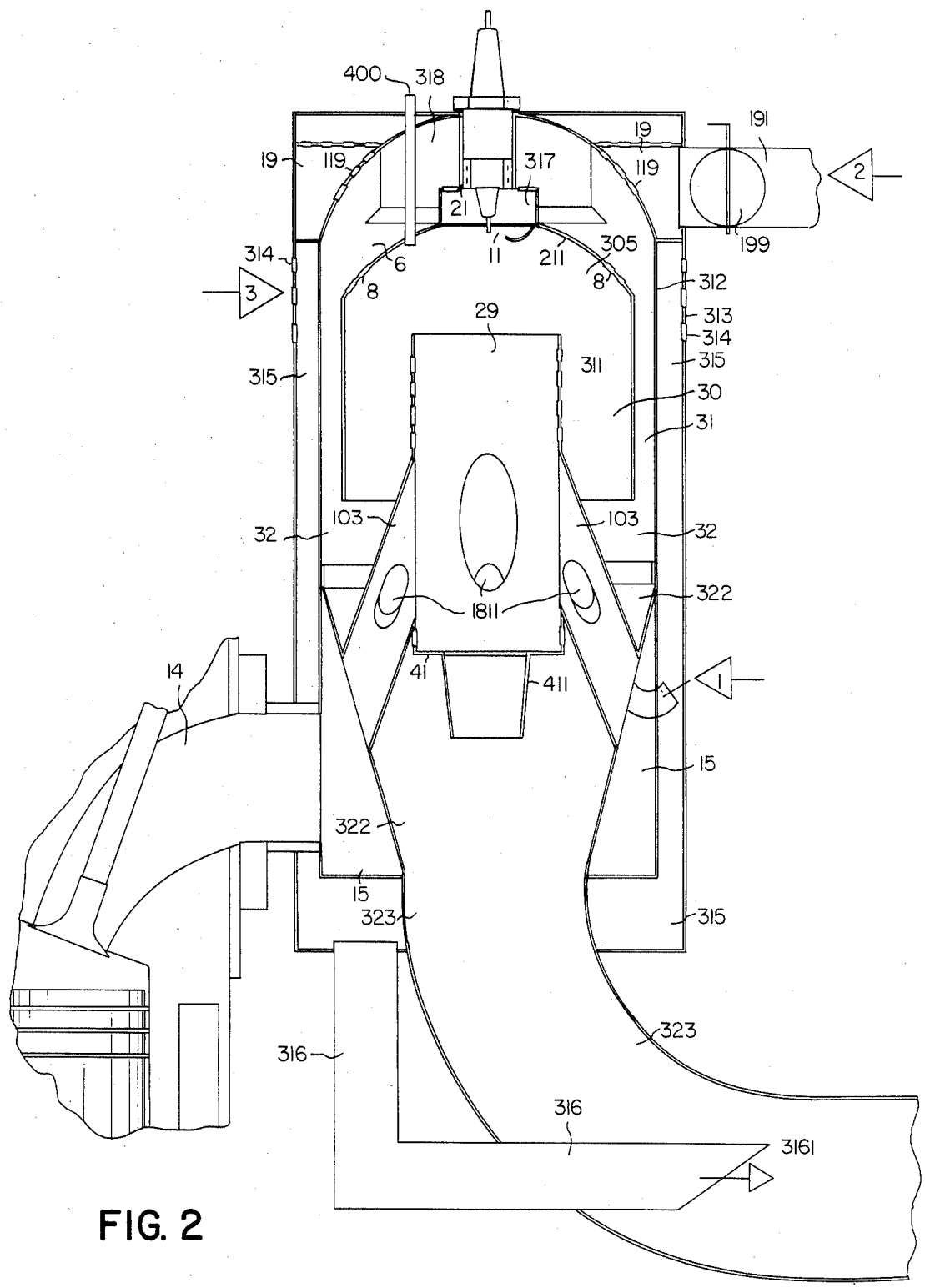
Figure 3:
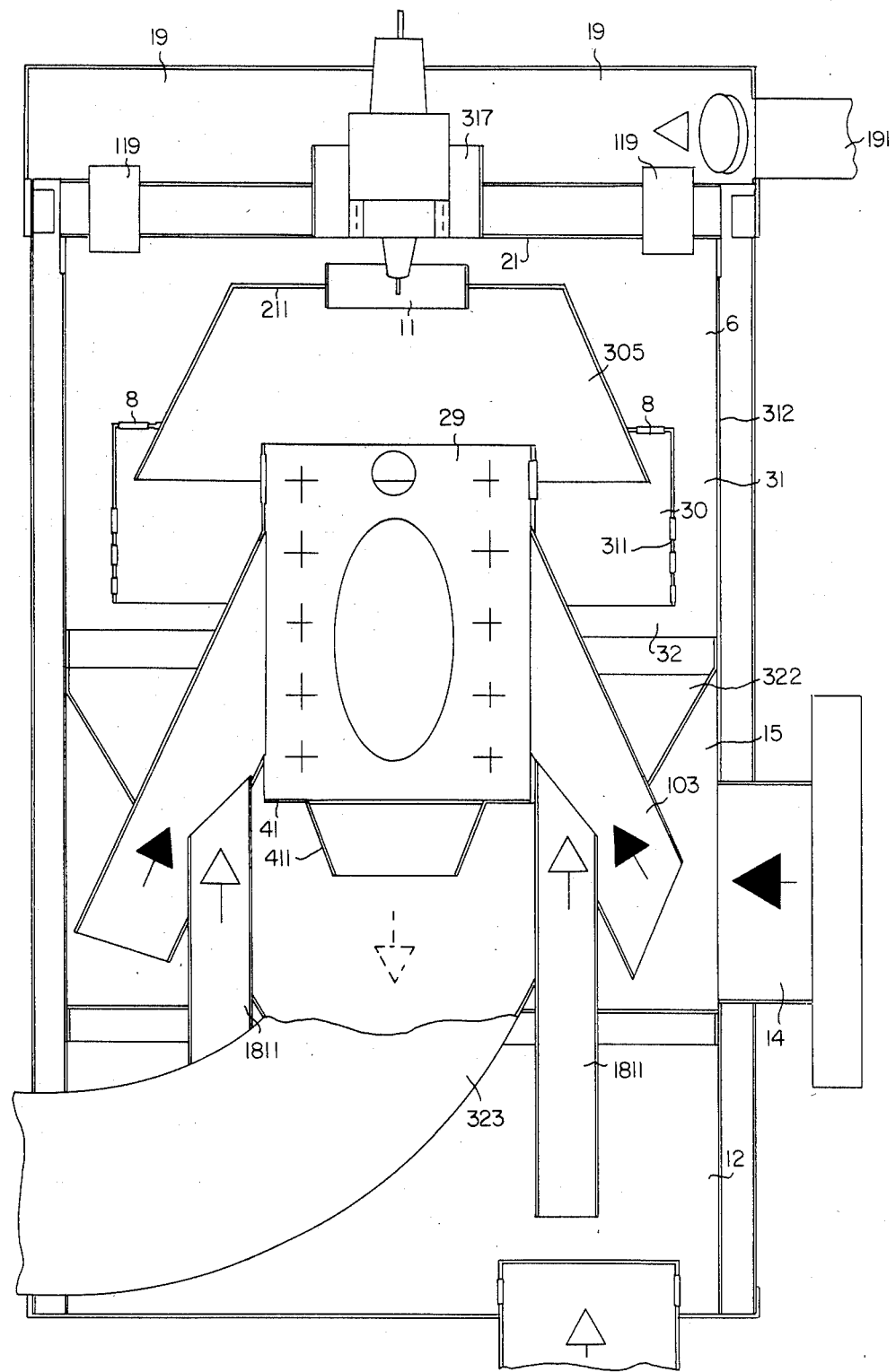

FIG. 2 introduces—instead of the air introduction chamber 12, provided for in FIGS. 1 and 3—an air flow section 315 which more or less surrounds the device, from which the air injection into the pipes 1811 takes place.

The hot gas suction pipe is designated by 316 in FIG. 2 and its entry into the draft section 323 or their subsequent spaces, by 3161. The white arrow numbered 1 points to the air mixture path through pipes 1811, the white arrow numbered 2 to the air post mixing path and the white arrow numbered 3 to the entry opening of this cooling air path, which represents a thermal terminal limit of the whole device. A pressure equalization, which has proven advantageous, takes place through the annular area 317, surrounding the ignition element in FIG. 2.

This pressure equalization, expanded by the pipes 119 which connect to a larger air chamber 19, returns in FIG. 3. It is also pointed out there that with a possible use of ventilation admission pressure in the auxiliary air mixing system, this is done through pipe 191, which appears in all three schematic drawings.

It is, therefore, desired that the present invention not be limited to the embodiment specifically described, but that it include all such modifications and variations as would be obvious to those of ordinary skill in this art. The scope of my invention should be determined by the equivalents of the various terms as recited in the following annexed claims.

What is claimed is:

1. Afterburner apparatus for internal combustion engines and adapted for synchronized ignition of the internal combustion engine and of gases in the afterburner apparatus, comprising:

an afterburner combustion chamber for receiving engine exhaust gases;
spark ignition means located within an ignition area of said afterburner combustion chamber;
a volume expansion chamber extending from said ignition area;
a convergent flow channel communicating with said volume expansion chamber;
a draft section communicating with said convergent flow channel for forming a gas column and being tuned by the cross section and length thereof for optimum filling of the engine combustion chamber;
means for introducing ambient air flow into said draft section for stabilizing the thermal accumulation within said afterburner apparatus;
a peripheral afterburn area in the region of said afterburner combustion chamber;
means for supplying auxiliary air to said peripheral afterburn area prior to ignition;
a reflection wall upstream from said afterburner combustion chamber; and
feeding means for the expulsion of exhaust gas onto said reflection wall and located axially inside said afterburner apparatus.

2. Afterburner apparatus as claimed in claim 1, further comprising a noise abating exit section communicating with said draft section.

3. Afterburner apparatus as claimed in claim 1, wherein said feeding means includes an open-ended perforated cylinder, end pipes extending into the outer wall of said cylinder for the introduction of engine exhaust waste gas, means for purging said cylinder with ambient air, an end of said cylinder extending toward said convergent flow channel and including an acoustic wave reflex rim with a flame ignition pipe, and said afterburner apparatus further comprising a space surrounding said cylinder and reflection wall for dividing the air supply for said peripheral afterburn area into two paths, one path for purging said cylinder and the other path for purging of the downstream afterburner chamber area, and air being induced by the suction effect of said draft section.

4. Afterburner apparatus as claimed in claim 1, wherein at least one of said ignition area, volume expansion chamber, said peripheral afterburn area, and said reflection wall includes a ceramic surface.

5. Afterburner apparatus as claimed in claim 3, further comprising an annular area surrounding said ignition area and communicating with an opposing air inlet chamber open to the free atmosphere.

* * * * *